May 2, 1944.                J. I. R. BOIVIE                2,347,731
                              GAS PURIFIER
                            Filed July 3, 1942
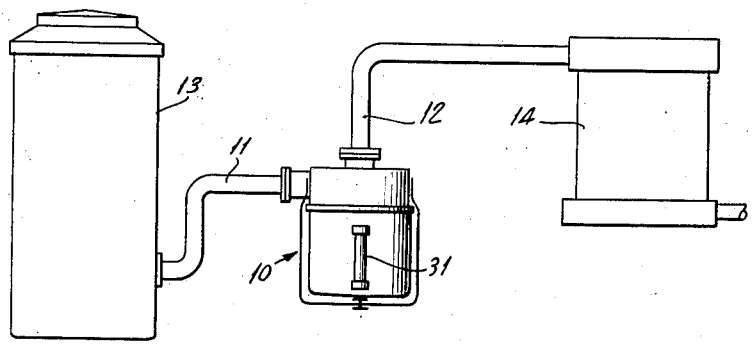
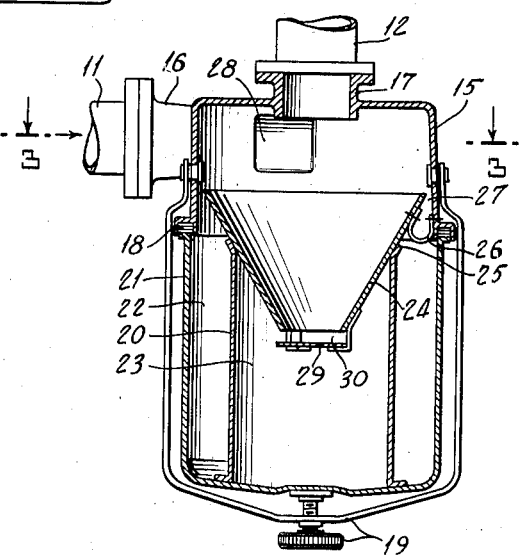
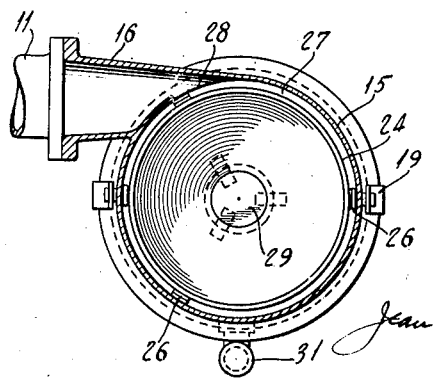
INVENTOR
Jean Ivan Ragnar Boivie
BY
James C. Markl
his ATTORNEY Patented May 2, 1944

2,347,731

UNITED STATES PATENT OFFICE 2,347,731

GAS PURIFIER

Jean Ivan Ragnar Boivie, Stockholm, Sweden

Application July 3, 1942, Serial No. 449,611
In Sweden December 7, 1940

3 Claims. (Cl. 209—144)

The present invention relates to a device for removing entrained solid particles from a flow of gas, preferably for the separation of soot in gas generators for the operation of motor vehicles.

In previously known types of gas producers the separation of soot from the gas coming from the generator proper has been effected either by passing the gas, prior to its entry into the motor, through a number of filter cloths of fabric, usually used in coal gas producers or through wet or cork filters in wood gas producers, or by first removing coarser or middle-sized solid particles from the flow of gas in a centrifugal or cyclone separator, that is, a usually cylindrical container in which a rapid rotation is imparted to the gas, the entrained particles being separated centrifugally. Generally this centrifugal separator is connected to the supply lines as near the generator as possible, which results in the separator, not only removing from 96 to 98% of the impurities, but also extinguishing the sparks and cooling the flow of gas which then, in a relatively pure state, passes through the cooler proper on its passage to the above-mentioned fine filter where any remaining dust-like particles are removed. The dust particles which are caught in the fine filter and which consist not only of soot but also include mineral substances, must be separated from the gas before the latter is allowed to enter the motor, as otherwise the sharp-edged particles would pollute the oil and cause increased wear or even choking.

In order to avoid the generally very troublesome cleaning of the fine filter, it is desirable to remove a maximum amount of impurities in the cyclone separator. For this purpose it has previously been proposed to provide the inner chamber of the separator intended for separating middle-sized coal particles with a number of concentric cylindrical walls arranged therein and to dispose in the tangential inlet opening of the cyclone separator an automatic valve serving to impart to the flow of gas a constant velocity of rotation, the amount of gas through the filter being variable. All these devices have, however, considerably complicated the construction of the separator and made its emptying or cleaning more difficult, without improving in any appreciable degree its operative qualities. On the contrary, the movable valve has had a tendency to get jammed, thus ceasing to function in a satisfactory manner.

In devices according to the present invention said drawbacks are eliminated, a very efficient separation of solid particles from the flow of gas being at the same time obtained without the use either of movable parts or other complicated devices. The subject matter of the invention consists of a vertical, preferably cylindrical centrifugal or cyclone separator connected to the gas producer and provided with a rotary chamber formed with a tangential gas inlet and a central gas outlet as well as a detachable soot collector divided into chambers. In comparison with previous constructions of this kind the subject matter of the present invention is extremely simple from a structural point of view, being therefore cheap to manufacture and easy to handle. To this end a conical part arranged between the rotary chamber and the soot collector bears against and is extended downward past a partition dividing the soot collector into an outer jacket chamber and an inner central chamber, so as to form a funnel running into the interior of the central chamber. Besides, there should be arranged beneath the lower horizontal plane of the mouth of the funnel a horizontal disc preferably supported by the funnel, at such a distance from the mouth of the funnel that the particles separated centrifugally from the flow of gas rotating along the inside of the funnel can pass freely to the central chamber through the annular clearance space formed between the mouth of the funnel and the disc without allowing the passage in the opposite direction of floating dust particles from the central chamber.

In order to obtain an efficient joint between the two chambers of the soot collector it is advisable to resiliently support the funnel by the inner wall of the rotary chamber in such a manner that the funnel, when the soot collector is put in place, is caused to bear in a resilient and leak-tight manner against the upper edge of the partition. Finally it is advantageous to provide the inlet opening of the rotary chamber with a rigid regulating device, such as an adjustable slide-shutter for adjusting the size of the opening to different types of vehicles and motors. This device may be of any suitable kind, or may even be omitted if the cyclone separator has been especially designed for the type of vehicle with which it is intended to be used.

The invention will be more fully described hereinafter with reference to the embodiment shown by way of example in Figs. 1–3 of the accompanying drawing, besides which also further characteristics of the invention will be set forth. Fig. 1 shows a cyclone separator according to the invention arranged between a gas producer and its fine filter, while Fig. 2 is a vertical section of the same separator and Fig. 3 a horizontal section of the rotary chamber of the separator.

As appears from Fig. 1, the cyclone separator 10 is of the cylindrical type and arranged in the vertical position in the connecting conduit 11, 12 between a gas producer 13 and the fine filter 14. The separator consists of three main parts, namely a substantially cylindrical upper part 10 preferably of cast-iron constituting the rotary chamber 15, which is suitably mounted on the vehicle. The supply conduit 16 communicates tangentially with the side of this chamber, while the outlet conduit 17 is connected to the top thereof. Removably secured to the open lower end of the rotary chamber by means of a suitable locking device 19, such as a bail and knurled screw is a soot collector 21 divided by the partition 20 into two concentric chambers, the outer jacket chamber 22 of the container serving for collecting coarser particles, whereas its central chamber 23 is adapted to catch the middle-sized or relatively fine particles entrained by the flow of gas. A packing ring 18 provides an air tight seal between the collector 21 and chamber 15. A conical funnel 24 is resiliently connected to the lower part of chamber 15 in such a manner that, when the soot container 21, preferably made of pressed steel plate, is pushed upwards against the annular packing 18 at the lower edge of the rotary chamber 15, the upper edge 25 of the partition 20 between the jacket and central chambers of the soot container is brought to bear against the outer side of the funnel, thus automatically forming the necessary joint with the funnel. The funnel 24 will thus be carried by the partition 20 around its whole periphery and kept in place by the above-mentioned spring device which suitably comprises three bent flat springs 26 arranged between the upper edge of the funnel and the inside of the rotary chamber. In this case, the upwardly directed mouth of the funnel is separated from the inner wall of the rotary container by an annular slit 27 of such a width that the coarser particles thrown out by the rotating air current can fall down through the slit into the jacket chamber 22 of the soot collector. In the embodiment shown both the rotary chamber 15 and the soot collector 21 are cylindrical, the coarser particles thus falling down through the slit 27 into the jacket chamber 22 exclusively by gravity. However, by giving the rotary chamber of the soot collector another shape it is evidently possible to utilize in part the centrifugal force for this transport. The upper edge of the funnel is, according to the drawing, situated at some distance beneath the lowest point of the inlet opening 28 for the purpose of preventing the production of disturbing vortical currents or the like, but it is obvious that the funnel may be raised also above this point, if the upper edge of the funnel is provided with a cylindrical screen or the like.

After the coarser particles have been separated from the flow of gas and fallen down into the jacket chamber of the soot collector, the soot particles are prevented from whirling up again from said chamber partly on account of the shape of the chamber, and partly owing to the jacket chamber being closed except for the relatively narrow slit 27. If, however, it is desired further to prevent the soot particles from whirling up again in this manner from the jacket chamber, the latter may be provided with radially directed stopping members in the shape of flanges, sheets or the like, or the soot collector may be given a larger diameter than the rotary chamber or an annular pocket may be arranged between the upper funnel edge and the corresponding part of the wall of the surrounding rotary chamber, by disposing the first-named screen which, for this purpose, may also be suitably given a slightly conical shape. The same effect may also be obtained, if, instead, the screen is arranged on the wall of the rotary chamber opposite the upper funnel edge.

The gas thus freed from coarser particles in the rotary chamber is forced by the incoming gas to continue its rotary motion along the inner walls of the funnel in the downward direction, a diameter continuously decreasing, which gradually increases the angular velocity, with the result that the separating capacity of the flow of gas at the same time increases. When the flow of gas has reached the lower mouth of the funnel, its velocity of rotation and therewith its separating capacity are at a maximum, it thus being possible to separate here substantially finer particles than would have been possible in the rotary chamber or at the upper part of the funnel. These fine particles together with such particles as have been separated on the inner walls of the funnel and have, simultaneously with the flow of gas, been caused to travel gradually downward, are separated centrifugally between the lower funnel opening and a disc or plate 29 provided beneath said opening, and then gradually settle on the bottom of the central chamber 23. The plate 29, which is supported by the funnel 24 at three points but may obviously also be supported in any other suitable manner, ensures that a rapidly rotating gas column may be present in the funnel, without causing rapid rotation of the gas in the central chamber 23 where, as is generally the case with hitherto known cyclone separators, it would tend to whirl up dust particles which have already settled.

This results in an extremely efficient separation of soot, without it being necessary to arrange any auxiliary means whatsoever in the central chamber, this being of great advantage, when the container is to be emptied or cleaned, because all parts are easily accessible. The emptying of the soot collector 21 is effected in the usual manner, the locking member 19, which, in this case, consists of a pivotal bail provided with a centrally arranged knurled screw, being displaced laterally, whereupon the soot collector is pulled downward and then turned upside down, so that the soot together with the other collected particles will fall out of the container. As the conical funnel 24 together with the plate 29 will remain in the rotary chamber during the emptying process, the soot collector 21 will thus, after emptying, only contain the partition 20 which is no obstacle to the cleaning of the container. A handle 31 arranged on the outside facilitates the handling of the soot collector. The two chambers 22 and 23 of the latter are, as regards their size, preferably so proportioned that both chambers become filled at substantially the same time, the permissible filling level in the embodiment shown being higher in the jacket chamber 22 than in the central chamber 23. The volume of the central chamber may, however, be easily proportioned by suitably choosing the diameter of the partition 20 or, if desired, by giving said partition a shape differing from the cylindrical shape, for example, a conical shape.

The invention obviously is not limited to the embodiment of a centrifugal separator for gas producers as shown by way of example, but may be varied in several ways or utilized for other purposes, without departing from the spirit of the invention. It is thus possible, as has already been indicated at the beginning, to provide the inlet opening 28 of the rotary chamber with a suitably rigid regulating device, such as an adjustable slide-shutter, for the purpose of adjusting the size of the opening to the type of vehicle with which the device is intended to be used. Tests have, however, shown that such a measure is not necessary in normal cases, a device of the kind shown in the drawing fully sufficing for effecting an efficient separation.

What I claim is:

1. In a device for centrifugally separating solid particles from gas, a member open at the bottom and providing a generally cylindrical chamber, means forming an inlet communicating tangentially with said chamber, means forming an outlet communicating with the top of said chamber, a generally cylindrical solid particle collector open at the top, a cylindrical partition in said collector dividing the latter into a central and an annular chamber, an open ended conical member supported by the upper edge of said partition and having its smaller lower end extending into said central chamber, and its larger upper end extending into said cylindrical chamber, means for spacing said upper end from the wall of said cylindrical chamber to provide an annular space communicating with said annular chamber, and means for removably securing the open upper end of said collector in substantially air tight relation to the open bottom end of the first-mentioned member.

2. In a device for centrifugally separating solid particles from gas, a member open at the bottom and providing a generally cylindrical chamber, means forming an inlet communicating tangentially with said chamber, means forming an outlet communicating with the top of said chamber, a generally cylindrical solid particle collector open at the top, a cylindrical partition in said collector dividing the latter into a central and an annular chamber, an open ended conical member supported by the upper edge of said partition and having its smaller lower end extending into said central chamber and its larger upper end extending into said cylindrical chamber, a disc substantially parallel to and spaced below the open lower end of said conical member, means for spacing said upper end from the wall of said cylindrical chamber to provide an annular communication between said cylindrical chamber and said annular chamber, and means for removably securing the open upper end of said collector in substantially air tight relation to the open bottom end of the first-mentioned member.

3. In a device for centrifugally separating solid particles from gas, a member open at the bottom and providing a generally cylindrical chamber, means forming an inlet communicating tangentially with said chamber, means forming an outlet communicating with the top of said chamber, a generally cylindrical solid particle collector open at the top, a cylindrical partition in said collector dividing the latter into a central and an annular chamber, an open ended conical member supported by the upper edge of said partition and having its smaller lower end extending into said central chamber, and its larger upper end extending into said cylindrical chamber, resilient means for urging said conical member into contact with said cylindrical partition and for spacing the upper end of the conical member from the wall of said cylindrical chamber to provide an annular communication between said cylindrical chamber and said annular chamber, and means for removably securing the open upper end of said collector in substantially air tight relation to the open bottom end of the first-mentioned member.

JEAN IVAN RAGNAR BOIVIE.